United States Patent
Dake et al.

(10) Patent No.: US 7,213,163 B2
(45) Date of Patent: May 1, 2007

(54) RESTORING POWER IN A HOT SWAPPABLE MULTI-SERVER DATA PROCESSING ENVIRONMENT

(75) Inventors: Gregory William Dake, Durham, NC (US); Jeffrey Michael Franke, Apex, NC (US); Donald Eugene Johnson, Apex, NC (US); Shane Michael Lardinois, Durham, NC (US); Michael Scott Rollins, Durham, NC (US); David Robert Woodham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/606,059

(22) Filed: Jun. 25, 2003

(65) Prior Publication Data

US 2004/0268157 A1    Dec. 30, 2004

(51) Int. Cl.
  *G06F 1/32* (2006.01)
  *G06F 1/26* (2006.01)
(52) U.S. Cl. .................. 713/324; 713/320; 713/300; 340/825
(58) Field of Classification Search .............. None
  See application file for complete search history.

(56) References Cited

U.S. PATENT DOCUMENTS 5,548,763 A    8/1996   Combs et al.
5,784,628 A    7/1998   Reneris
5,996,035 A    11/1999  Allen et al.
2004/0117536 A1*  6/2004  Franke et al. ............... 710/302

FOREIGN PATENT DOCUMENTS

JP    61187003 A    2/1985

* cited by examiner

*Primary Examiner*—James K. Trujillo
*Assistant Examiner*—Anand B. Patel
(74) *Attorney, Agent, or Firm*—H. Artoush Ohanian; Cynthia S. Byrd; Biggers & Ohanian, LLP

(57) ABSTRACT

A data processing network includes a set of servers, at least one switch module to interconnect the servers, and a management module. The management module consults power state information stored in the network following a power transition and restores power to at least some of the servers and switch modules based on the power state information. The power state information prevents the management module from restoring power to servers and switch modules having incompatible communication protocols. In one embodiment, the plurality of servers and the switch modules are hot-swappable modules that are all inserted into a single chassis. In this embodiment, the server modules and at least one switch module share selected resources of the network including system power. The switch modules and servers may employ Ethernet, fiber channel, optical, and serial communication protocols.

20 Claims, 4 Drawing Sheets

| MODULE | PRESENT | OFF | | ON |
| --- | --- | --- | --- | --- |
| | | DISABLED | ENABLED | |
| BLADE 1 | X | | | X |
| BLADE 2 | X | | X | |
| . . . | | | | |
| BLADE 14 | | | | |
| SWITCH 1 | X | | | X |
| SWITCH 2 | X | | | X |
| SWITCH 3 | X | X | | |
| SWITCH 4 | | | | |
| | | | | | ns and more particularly the field of data processing system power restoration following a power transition.

RESTORING POWER IN A HOT SWAPPABLE MULTI-SERVER DATA PROCESSING ENVIRONMENT

BACKGROUND

1. Field of the Present Invention

The present invention is in the field of data processing systems and more particularly the field of data processing system power restoration following a power transition.

2. History of Related Art

In the field of data processing systems and networks, many applications such as Internet data centers are implemented with a set of densely packed servers interconnected using one or more switching modules. In this type of environment, it is highly desirable if the servers, switch modules, and other components of the network are hot-swappable so that maintenance can be performed without sacrificing the network's availability. In addition, it is desirable if the network is capable of implementing various interconnection protocols or fabrics using switching modules of different types. While these characteristics are desirable in a multi-server network configuration, the ability to hot-swap various components, some of which have different protocol characteristics than others, can result in compatibility problems. Specifically, as operators, technicians, and maintenance personnel attempt to address network problems by swapping various cards or modules, some of which may have different communication protocol characteristics than others, in and out of a densely packed server configuration, it is difficult to maintain complete compatibility among all of the modules in the network. Incompatibilities between various communication protocols, for example, can damage system components. It would be desirable, therefore, to implement a system and method for managing power in a multi-server data processing network. It would be further desirable if the implemented network and method were highly automated to prevent powering on incompatible modules within the network. It would be still further desirable if the implemented network and method automatically restored power to the various network modules following a power reset such that the power state after a power transition mirrored the power state before the transition.

SUMMARY OF THE INVENTION

The identified objectives are achieved by a data processing network according to the present invention. The network includes a set of servers, at least one switch module to interconnect the servers, and a management module. The management module consults power state information stored in persistent memory following a power transition and restores power to at least some of the servers and switch modules based on the power state information. The power state information prevents the management module from restoring power to servers and switch modules having incompatible communication protocols. In one embodiment, the plurality of servers and the switch modules are hot-swappable modules that are all inserted into a single chassis. In this embodiment, the server modules and at least one switch module share selected resources of the network including system power. The switch modules and server modules may employ Ethernet, fibre channel, optical, and serial communication protocols.

BRIEF DESCRIPTION OF THE DRAWINGS

Other objects and advantages of the invention will become apparent upon reading the following detailed description and upon reference to the accompanying drawings in which.

Figure 1:
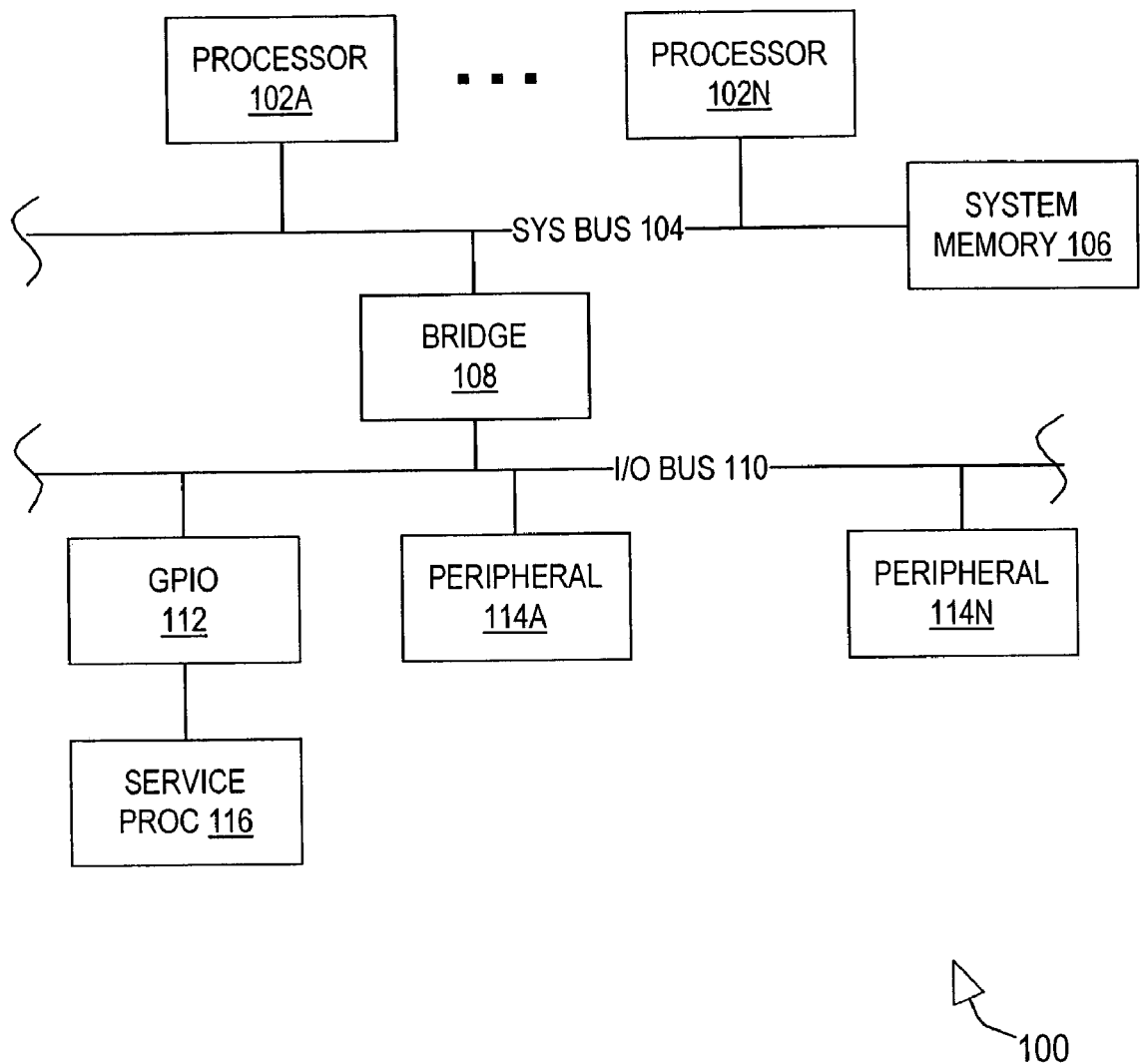
FIG. 1 is a block diagram of selected elements of a data processing system suitable for use in one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the invention is concerned with restoring and monitoring power states of various modules in a multi-server, shared power environment. When a management module of the system is powered on, it determines whether a management module hot swap has occurred or whether AC power to the entire chassis has been reset. Depending upon this determination, the management module then either restores the power states of the various modules to their last known state or detects the current power states and preserves them for future use. By configuring the management module to perform this power monitoring and restoration function, the invention adds useful and potentially error reducing automation to environments characterized by multiple, interconnected systems sharing a common set of resources including power.

Turning now to the drawings, FIG. 1 is a block diagram of selected features of a data processing system 100 suitable for use in conjunction with the present invention. The depicted elements of data processing system 100 may be implemented entirely upon a single printed circuit board. In this embodiment, data processing system 100 may be alternatively referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In the depicted embodiment of server blade 100, a bus bridge 108 provides an interface between system bus 104 and an I/O bus 110. One or more peripheral devices 114A through 114N (generically or collectively referred to as peripheral device(s) 114) as well as a general purpose I/O (GPIO) port are connected to I/O bus 110. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a local service processor 116 connected to GPIO port 112. Local service processor 116 is configured to provide support for main processors 102. This support may include, for example, monitoring the power supplied to main processor(s) 102 and, in the event of a blade crash, initiating a restart of the main processors.

Figure 2A:
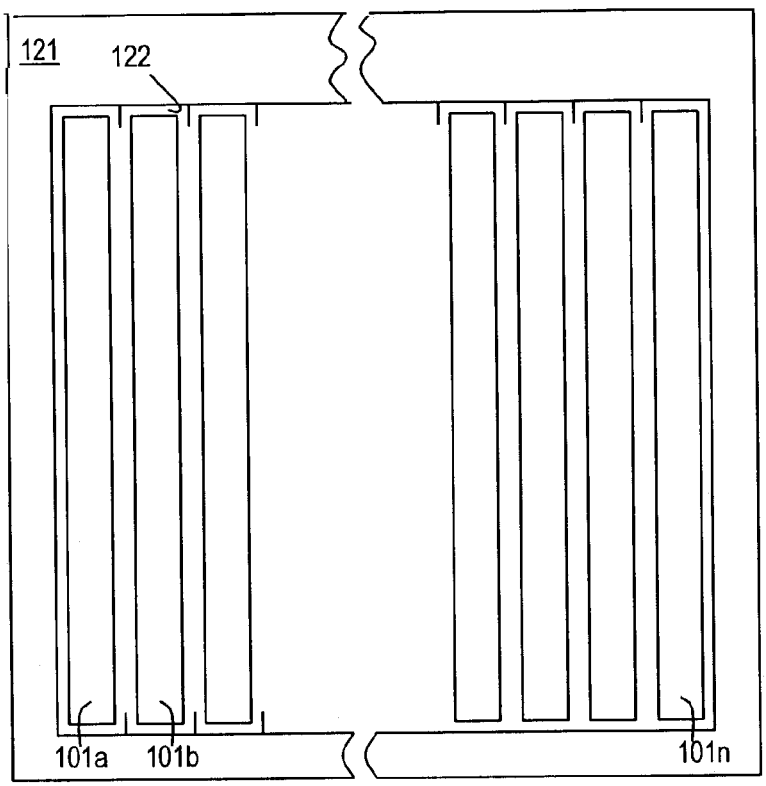
FIG. 2A and FIG. 2B depict a front view and back view respectively of a single chassis, multi-server data processing network suitable for use in an embodiment of the present invention.
Figure 2B:
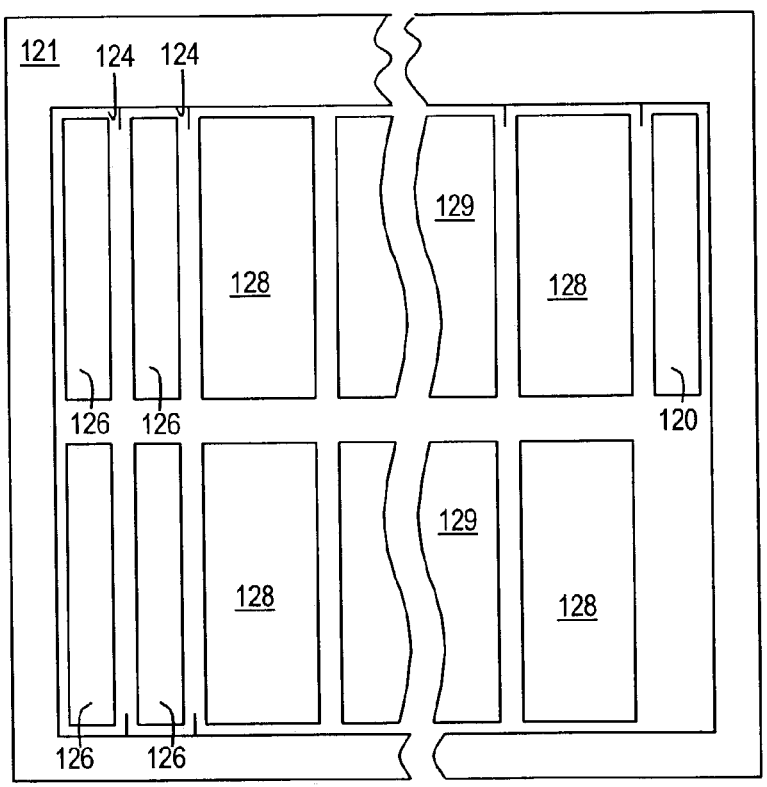

Turning now to FIG. 2A and FIG. 2B a front view and rear view respectively of a data processing network 200 according to one implementation of the present invention is depicted. Data processing network 200, also referred to in this disclosure as a blade center 200, includes a chassis or cabinet 121 having a plurality of slots or racks 122. Each rack 122 in the front side of cabinet 121 (FIG. 2A) is configured to receive a module such as a server blade module identified by reference numerals 101a through 101n (generically or collectively referred to as server blade module(s) 101) via a suitable connection mechanism such as a traditional edge connector. Each server blade module 101 typically contains one or more server blades 100 as described with respect to FIG. 1. In one implementation, each server blade module 101 is a 4 U component that may include as many as 16 server blades 100. Thus, the depicted embodiment of blade center 200 includes a set of server blade modules 101, each of which includes one or more server blades 100.

The backside of chassis 121 as depicted in FIG. 2B includes a set of racks 124 designed to receive as many as four switch modules 126, a management module 120, four power supplies modules 128, and a pair of fan or blower modules 129. The switch modules 126 provide connectivity between the server blade modules 101 and an external network. Switch modules 126 may include optical switching modules, fibre channel modules, Ethernet modules, and serial modules.

Network 200 as depicted in FIG. 2B includes a system management module 120 that is inserted into a slot 124 in cabinet 121. In the depicted embodiment, the dimension of management module 120 is different than the dimension of server blades 100 and management module slot 124 is sized to receive management module 120 while preventing inadvertent insertion of a blade module 101 into the slot. Management module 120 is typically implemented with a management module service processor configured to monitor and control resources and characteristics of network 200 that are shared by each server blade 100. These resources and characteristics may include, for example, the power applied to cabinet 121, cabinet cooling fans, and environmental characteristics such as the ambient temperature within cabinet 121.

As indicated above, the various switch modules 126 may have different protocols including operating voltages. In an implementation of blade center 200 (depicted in FIG. 3), for example, each blade module 101 includes two integrated Ethernet ports 132 and 134 that connect to two of the switch modules 126A and 126B respectively. In addition, blade module 101 can accommodate one or two switch option expansion cards indicated by reference numeral 135. Option card(s) 135, when present, provide third and fourth communication ports 136 and 138 respectively that connect to the third and fourth switch modules 126C and 126D respectively. Because all of the different switch module types likely have the same form factor, any switch module 126 can be inserted into any of the switch module bays. An incompatibility arises when a communication port of a server blade, whether it be one of the two integrated Ethernet ports (132, 134) or a communication port on an option card 135, connects to a switch module 126 having a different protocol. Whenever an incompatibility occurs, the communication path, in addition to being non-functional, may have a destructive effect on one or more modules. It is important, therefore, to maintain and monitor protocol compatibility between the switch modules 126 and the server blades 101 to which they are connected.

The present invention provides an automated method of monitoring server/switch compatibility in an environment characterized by multiple, interchangeable, and hot swappable servers within a single chassis in conjunction with multiple, interchangeable, hot-swappable switch modules having a variety of possible communication protocols. In the preferred embodiment, a management agent such as management module 120 is responsible for monitoring the power states of various components. When a management module 120 detects a power reset, if determines whether the power reset is the result of an AC power reset that effects the entire chassis or whether the power reset indicates merely that the management module, which is also hot-swappable, has been plugged into a system. If the reset occurs as a result of an AC power reset (and the management module determines that it is in the correct chassis), the management module restores the various server and switch modules to the last known good power state. If the management module determines that it has experienced a hot swap it records the current power state of the various modules for use following a subsequent AC power reset.

Figures 3, 4:
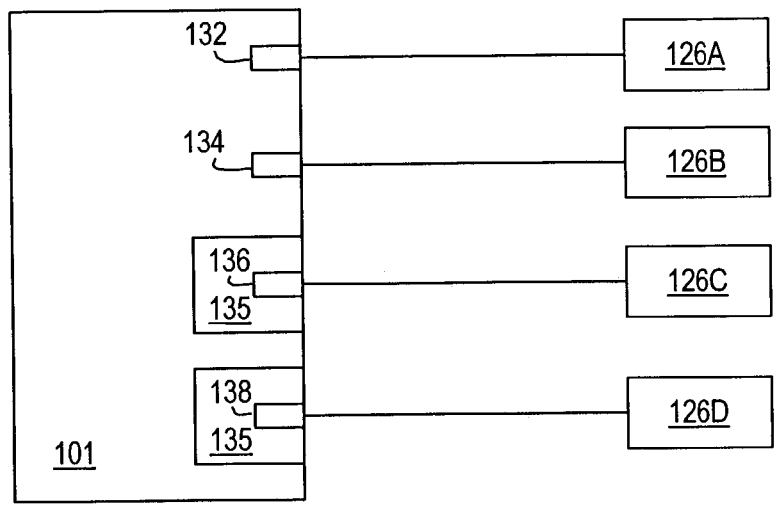
FIG. 3 is a block diagram of one embodiment of the network of FIGS. 2A and 2B emphasizing the connection between the server modules and switch modules that may comprise a portion of the network.
FIG. 4 is a conceptual representation of a table of power state information that is maintained by a management module of the data processing network according to one embodiment of the present invention.

Referring now to FIG. 4, a power state table 140 is shown to illustrate one aspect of a particular implementation of the present invention. In one embodiment, management module 120 maintains a table that includes the information shown in power state table 140 in non-volatile storage, such as a flash memory device or other form of electrically alterable ROM, battery backed CMOS, and the like that persists across power transitions. Table 140 according to the depicted embodiment includes an entry for at least each blade module 101 and each switch module 126.

For each entry in table 140, information indicative of the corresponding module's power state is maintained. In the context of the current invention, the possible power states for each module include an ON state, an OFF/ENABLED state, and an OFF/DISABLED state. The ON state, as its name suggests indicates that the corresponding module was on in the last recorded power state. The OFF/ENABLED state indicates that, while the module was powered off, the module had "permission" to be powered on if needed. The OFF/DISABLED state indicates that the corresponding module does not have permission to power on. Other implementations of table 140 incorporate additional power states including as an example, a STANDBY state indicating that the corresponding module was last known to be in a low power state. In addition to information concerning the indicated power states, the depicted embodiment of table 140 indicates, for each module entry, whether the module is physically present in the chassis. It is not required that all available slots in a chassis be occupied.

Figure 5:
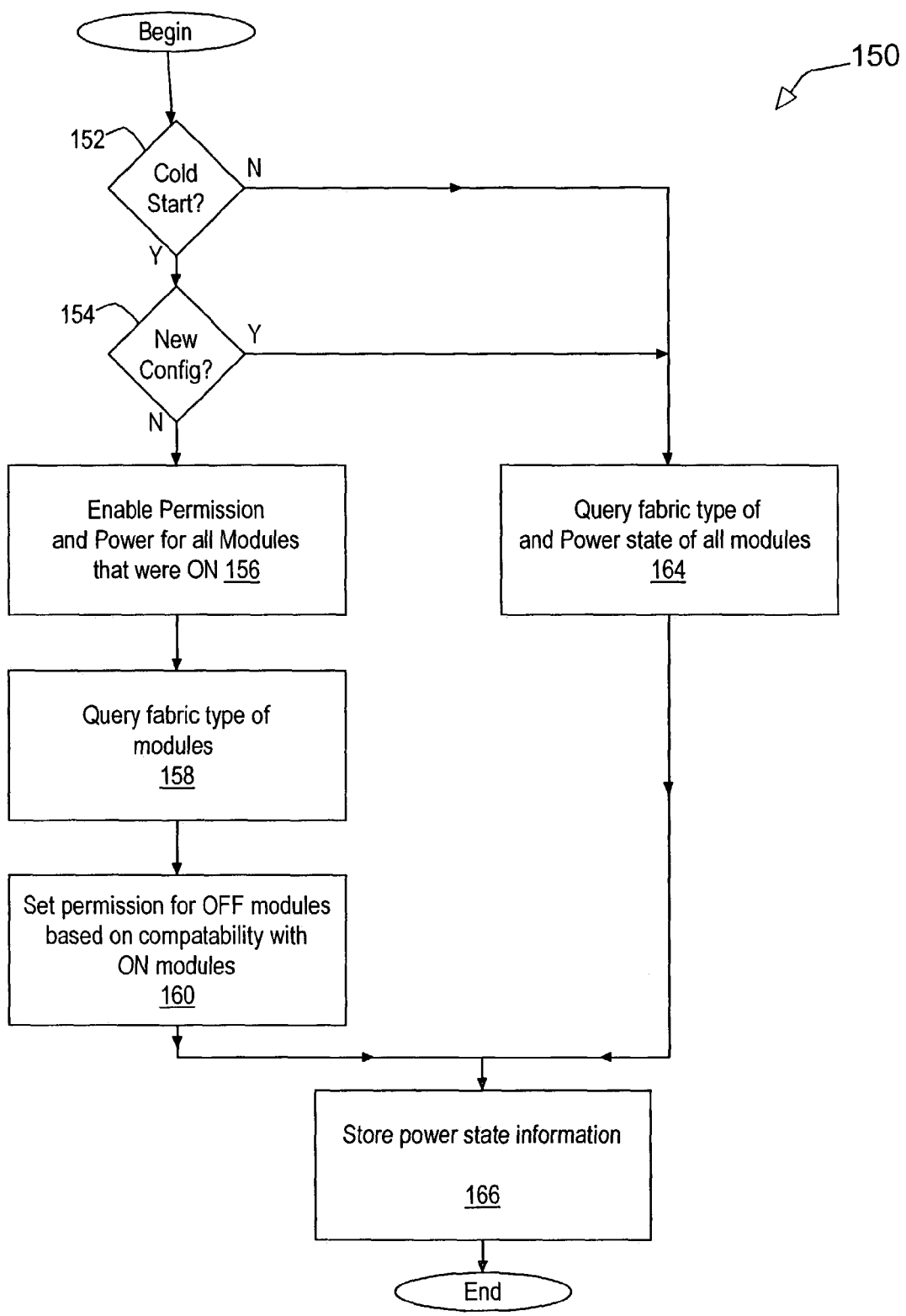
FIG. 5 is a flow diagram of a method of automated power management and restoration according to one embodiment of the present invention.

Referring now to FIG. 5, a flow diagram is presented to illustrate a method 150, according to the present invention, for automated restoration of power states in a multi-module, hot-swappable data processing environment. Method 150 initiates whenever management module 120 is powered on. The management module first determines (block 152) what caused it to be powered on. Specifically, management module 120 determines whether it has been plugged into a chassis to which power is being supplied (hot swapped) or whether a cold start has occurred. A cold start refers to a reset of AC power to the entire chassis. This determination is made, in one embodiment, by detecting whether any of the modules are powered on. Following a cold start, all modules will be powered down until powered up under management module control. Thus, a cold start is indicated if the management module detects that none of the system's modules are powered on.

If a cold start has occurred, the management module then determines (block 154) whether the system configuration has been altered from the last known good configuration. The configuration has changed if the management module determines that it is no longer in the same chassis that it was in previously or if the management module determines that one or more modules have been removed or inserted. The cold start v. hot swap determination, in combination with the configuration change determination, governs the power restoration action to be taken by the management module.

If a cold start has occurred and the configuration has not been altered, the present invention employs management module 120 to restore the power state of all the modules to the last known good power state based on the information stored in table 140. If a hot swap or a reconfiguration has occurred, the management module should passively learn the current power state configuration and store the configuration into table 140 for use during a subsequent restoration.

Thus, as depicted in FIG. 5, following a cold start determination in block 152 and a same-configuration determination in block 154, management module 120 begins to restore the modules to previous power states using table 140. Management module 120 checks each entry in table 140 and powers on (block 156) modules that were on previously (i.e., during the immediately preceding power tenure). After powering on the appropriate modules, management module 120 then queries (block 158) the "fabric" or protocol type of the remaining modules, sets (block 160) ON/OFF permission status for these modules based on their compatibility with the ON modules, and stores (block 166) the power state information to persistent memory.

If, for example, a server blade 101 having an Ethernet option card for communication port 136 (see FIG. 3) is powered on from a previous power tenure, the management module restores that module to a powered on state. Then, after checking the fabric type of the remaining modules, the management module denies power permission (sets the OFF/DISABLED bit in table 140) to any of the "off" modules having a non-Ethernet communication port 136 and to any non-Ethernet switch module in the third switch module bay (i.e., switch module 126C). Because each server blade 101 can include as many as four communication ports and the system may include as many as four switch modules 126, the compatibility checking preferably checks every pair of server blade communication ports and switch modules to determine complete compatibility. In the implementation of server blade 101 as depicted in FIG. 3, two of the four communication ports (132 and 134) are Ethernet ports integrated into the blade itself. Because this part of the configuration is integrated, it is effectively non-alterable. In addition, the switch modules 126A and 126B to which these integrated ports are connected may be presumed to be Ethernet switches because they are always connected to Ethernet ports. Thus, the compatibility checking may be significantly simplified if the only variable components are the third and fourth communication ports 136 and 138 respectively of each server blade and the third and fourth switch modules 126C and 126D. In some embodiments, the table 140 may be expanded to include the fabric type of each communication port for each server blade and the fabric type of each switch module.

Querying the modules is achieved in one case by having the management module read module identification stored in a predetermined and accessible storage location within an EPROM or other non-volatile storage device on the module. In other cases, a module's fabric type may be determined by performing a preferably simple electrical test on the communication ports and switches themselves. If, for example, continuity testing can distinguish among the various types of communication ports in use by system 200 and management module 120 can manipulate the ports, electrical testing may be used to determine fabric type. Determining fabric type in this manner provides a measure of assurance in situations where, for example, an unauthorized swap of a server blade option card (reference numeral 135 in FIG. 3) is performed because such a change might not be reflected in the EPROM identifying information.

If the management module determines that a cold start has not occurred or that the current system configuration differs from the previous configuration, method 150 transitions from a restoration mode to a "learn" mode. In the learn mode, management module 120 detects (block 164) the current power states and fabric types of all the modules and stores (block 166) the information in the non-volatile storage for use during a subsequent power reset. In this manner, a hot-swapped management module will power on and learn the current power state configuration of the chassis in which it has been installed. Following the next AC power transition to the chassis, the management module will then be ready to restore the system to the previous state. Changes to the power state information table 140 may occur when modules are inserted or removed, or power permissions are altered under human intervention.

It will be apparent to those skilled in the art having the benefit of this disclosure that the present invention contemplates a network and method for managing power and power rest oration in a multi-server, shared power configuration. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A power management method for use in a multi-server data processing network, comprising:

responsive to detecting a power transition, determining whether the power transition is indicative of a cold start; and responsive to determining the power transition is indicative of a cold start, retrieving power state information and, based on the power state information, restoring power to at least some of the modules of the network, wherein the power state information represents the power state of the network prior to the power transition and further wherein the power state information prevents the powering on of network modules having incompatible communication protocols, including restoring power to any module indicated by the power state information as being on during a previous tenure.

2. The method of claim 1, further comprising, responsive to determining that the power transition is not indicative of a cold start, querying the network modules for their power state and communication protocol types and storing the power state and communication protocol information in non-volatile storage.

3. The method of claim 2, wherein querying a network module includes retrieving module identification information from a non-volatile storage device on the module.

4. The method of claim 2, wherein querying the network modules is further characterized as querying server modules and switch modules of the network, each server module comprising a symmetric multiprocessor system, and each switch module configured to interconnect the server modules.

5. The method of claim 4, wherein each network module and switch module is characterized by a communication protocol selected from Ethernet, fibre channel, optical and serial.

6. The method of claim 1, wherein restoring power is further characterized as querying the communication protocol type of remaining modules to set power permission based on compatibility of the remaining modules with the powered modules.

7. A data processing network, comprising:
a plurality of server modules;
at least one switch module connecting the servers; and
a management module to consult stored power state information following a power transition and to restore power to at least some of the server and switch modules based on the power state information to prevent the management module from restoring power to any server and switch modules having incompatible communication protocols, wherein the management module is configured to restore power to any module indicated by the power state information as being on during a previous tenure.

8. The network of claim 7, wherein the plurality of server modules comprise a plurality of symmetric multiprocessor (SMP) server modules housed within a single chassis, and further wherein the at least one switch module is housed within the chassis, and still further wherein the servers modules and at least one switch module share selected resources of the network including system power.

9. The network of claim 7, wherein the server modules and at least one switch module are compliant with a communication protocol selected from Ethernet, fibre channel, and serial.

10. The network of claim 7, wherein the management module is configured to:
determine whether the power transition is indicative of a cold start; and responsive to determining the power transition is indicative of a cold start, restore power to at least some of the modules based on the power state information, wherein the power state information represents the power state of the network prior to the power transition and further wherein the power state information prevents the management module from powering on of network modules having incompatible communication protocols.

11. The network of claim 10, wherein the management module is further configured to query the modules for their power state and communication protocol types responsive to determining that the power transition is not indicative of a cold start, and to store the power state and communication protocol information in non-volatile storage.

12. The network of claim 11, wherein each module includes module identification information stored in a non-volatile storage device on the module, wherein the identification information is indicative of the communication protocol type.

13. The network of claim 11, wherein each network module and switch module is characterized by a communication protocol selected from Ethernet, fibre channel, optical and serial.

14. The network of claim 11, wherein the management module is further configured to
query the communication protocol type of remaining modules to set power permission of the remaining modules based on their respective compatibility with the powered modules.

15. A computer program product comprising computer executable code for managing power states in a multi-server data processing network, the code being stored on a computer readable medium, comprising;
computer code means for determining whether a detected power transition is indicative of a cold start; and
computer code means, responsive to determining the power transition is indicative of a cold start, for retrieving power state information and, based on the power state information, for restoring power to at least some of the modules of the network, wherein the power state information represents the power state of the network prior to the power transition and further wherein the power state information prevents the powering on of network modules having incompatible communication protocols, including computer code means for restoring power to any module indicated by the power state information as being on during a previous tenure.

16. The computer program product of claim 15, further comprising, computer code means, responsive to determining that the power transition is not indicative of a cold start, for querying the network modules for their power state and communication protocol types and for storing the power state and communication protocol information in non-volatile storage.

17. The computer program product of claim 16, wherein the code means for querying a network module includes code means for retrieving module identification information from a non-volatile storage device on the module.

18. The computer program product of claim 16, wherein the code means for querying the network modules is further characterized as code means for querying server modules and switch modules of the network, each server module comprising a symmetric multiprocessor system, and each switch module configured to interconnect the server modules.

19. The computer program product of claim 18, wherein each network module and switch module is characterized by a communication protocol selected from Ethernet, fibre channel, optical and serial.

20. The computer program product of claim 15, wherein the code means for restoring power is further characterized as code means for querying the communication protocol type of remaining modules to set power permission based on compatibility of the remaining modules with the powered modules.

* * * * *

UNITED STATES PATENT AND TRADEMARK OFFICE
CERTIFICATE OF CORRECTION

PATENT NO.        : 7,213,163 B2  
APPLICATION NO.   : 10/606059  
DATED             : May 1, 2007  
INVENTOR(S)       : Dake et al.

Page 1 of 1

It is certified that error appears in the above-identified patent and that said Letters Patent is hereby corrected as shown below:

Title Page

Item (75) Inventors: delete "Jeffrey", and replace with -- Jeffery --.

Signed and Sealed this  
Twenty-fifth Day of June, 2013

Teresa Stanek Rea  
*Acting Director of the United States Patent and Trademark Office*